(12) United States Patent
Bunn

(10) Patent No.: US 8,621,980 B2
(45) Date of Patent: Jan. 7, 2014

(54) TEMPERATURE CONTROL SYSTEM

(75) Inventor: Arthur H. Bunn, Springfield, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 1228 days.

(21) Appl. No.: 10/521,613

(22) PCT Filed: Jul. 16, 2003

(86) PCT No.: PCT/US03/22338
§ 371 (c)(1),
(2), (4) Date: Aug. 6, 2007

(87) PCT Pub. No.: WO2004/006739
PCT Pub. Date: Jan. 22, 2004

(65) Prior Publication Data
US 2008/0041233 A1 Feb. 21, 2008

Related U.S. Application Data

(60) Provisional application No. 60/396,505, filed on Jul. 16, 2002.

(51) Int. Cl.
*A47J 31/00* (2006.01)
*H05B 6/64* (2006.01)

(52) U.S. Cl.
CPC .................................. *H05B 6/6435* (2013.01)
USPC ........................... 99/281; 222/146.5; 392/451

(58) Field of Classification Search
USPC .................... 99/280, 281, 285; 219/497, 505; 222/638–641, 644, 146.2, 154, 155
See application file for complete search history.

(56) References Cited

U.S. PATENT DOCUMENTS

| | | | |
|---|---|---|---|
| 3,345,934 A | | 10/1967 | Steiner |
| 4,470,999 A | * | 9/1984 | Carpiac .......................... 426/506 |
| 4,531,046 A | * | 7/1985 | Stover ........................... 392/442 |
| 4,978,833 A | * | 12/1990 | Knepler ......................... 392/449 |
| 5,549,035 A | * | 8/1996 | Wing-Chung .................. 99/281 |
| 5,842,353 A | * | 12/1998 | Kuo-Liang ..................... 62/190 |
| 6,089,409 A | * | 7/2000 | Hart et al. ................... 222/146.5 |
| 6,543,335 B1 | * | 4/2003 | Lassota ........................... 99/283 |
| 2001/0009609 A1 | * | 7/2001 | Bradenbaugh ................ 392/463 |
| 2002/0083840 A1 | * | 7/2002 | Lassota ........................... 99/275 |
| 2002/0129712 A1 | * | 9/2002 | Westbrook et al. ............ 99/279 |
| 2004/0159240 A1 | * | 8/2004 | Lyall, III ........................ 99/275 |

OTHER PUBLICATIONS

U.S. Appl. No. 60/396,505, filed Jul. 16, 2002, Bunn.
International Search Report for international application No. PCT/US0322338 entitled: Temperature Control System.

\* cited by examiner

*Primary Examiner* — Henry Yuen
*Assistant Examiner* — Thien S Tran
(74) *Attorney, Agent, or Firm* — Barnes & Thornburg LLP

(57) ABSTRACT

A temperature control system and apparatus for controlling the temperature of a beverage contained within a beverage server. The temperature control system enabling a user to control of a plurality of attributes of temperature of a beverage from the making of a beverage until the dispensing and disposal of the beverage.

38 Claims, 9 Drawing Sheets

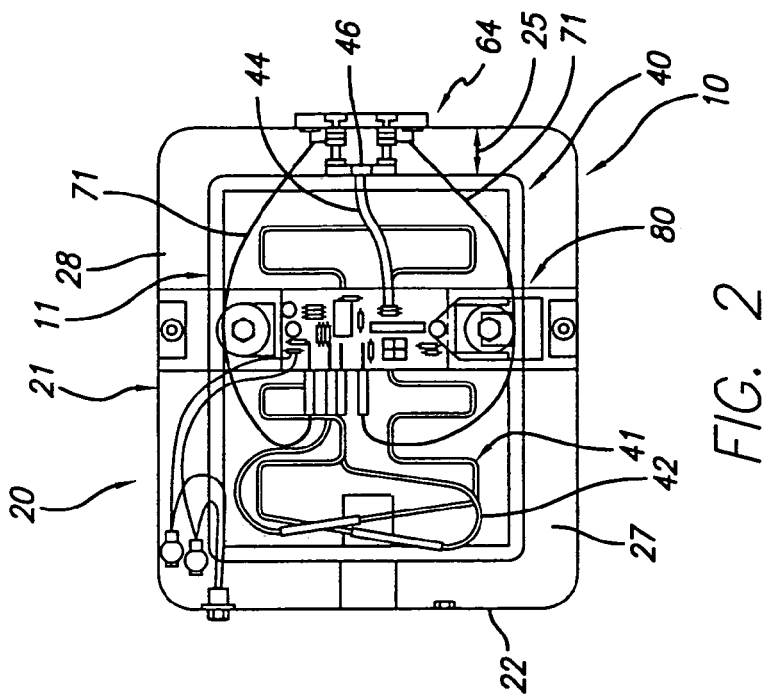
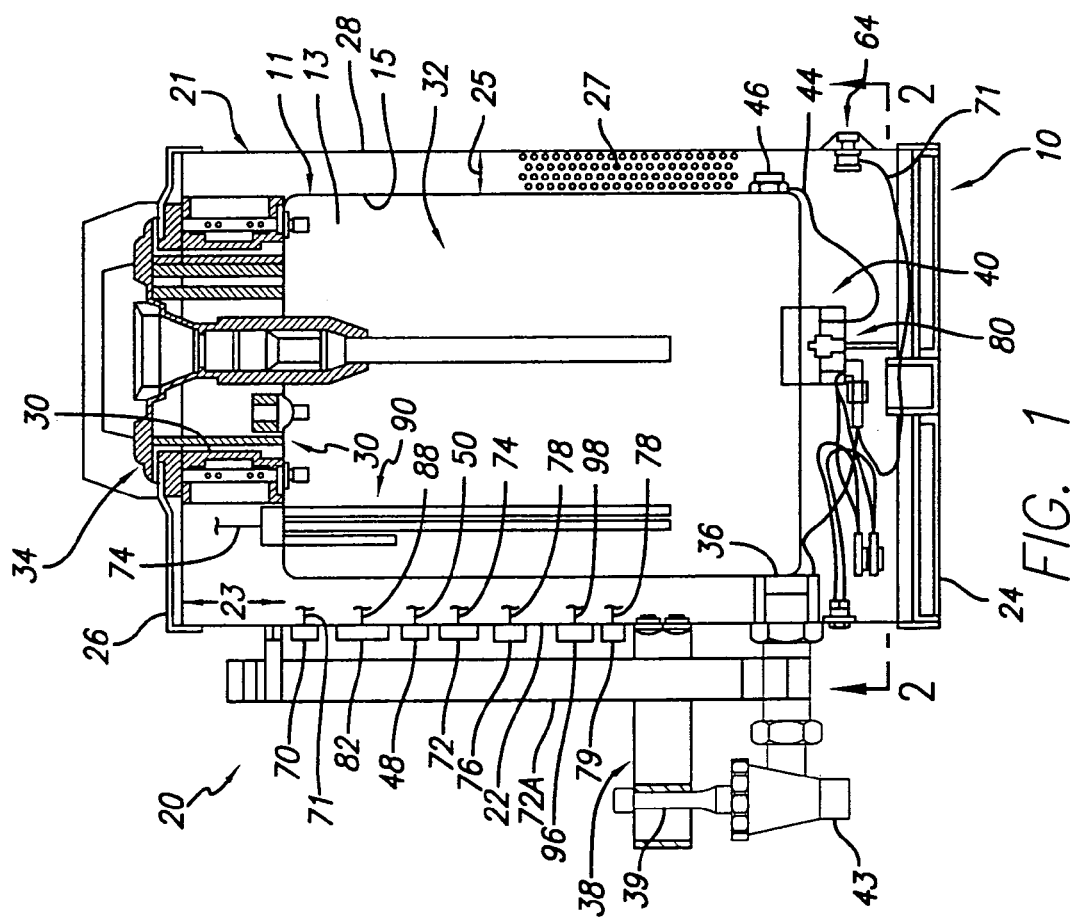
FIG. 1
FIG. 2

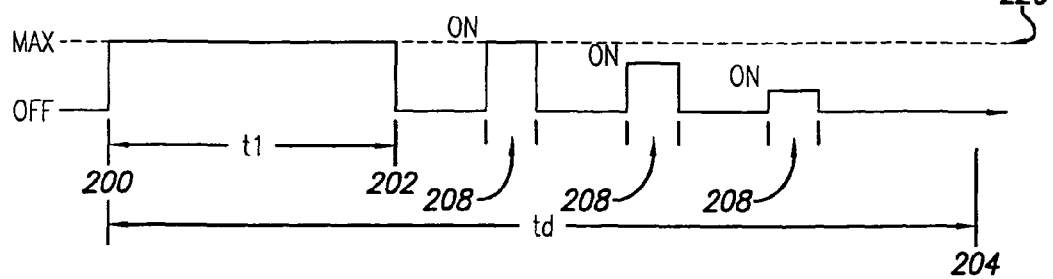
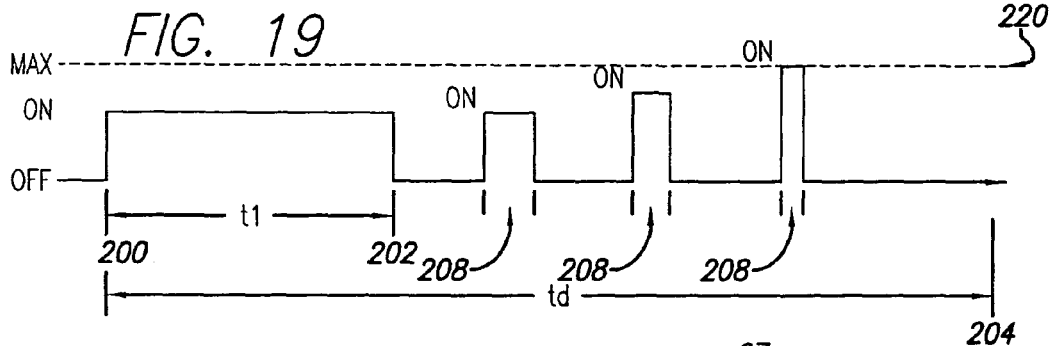
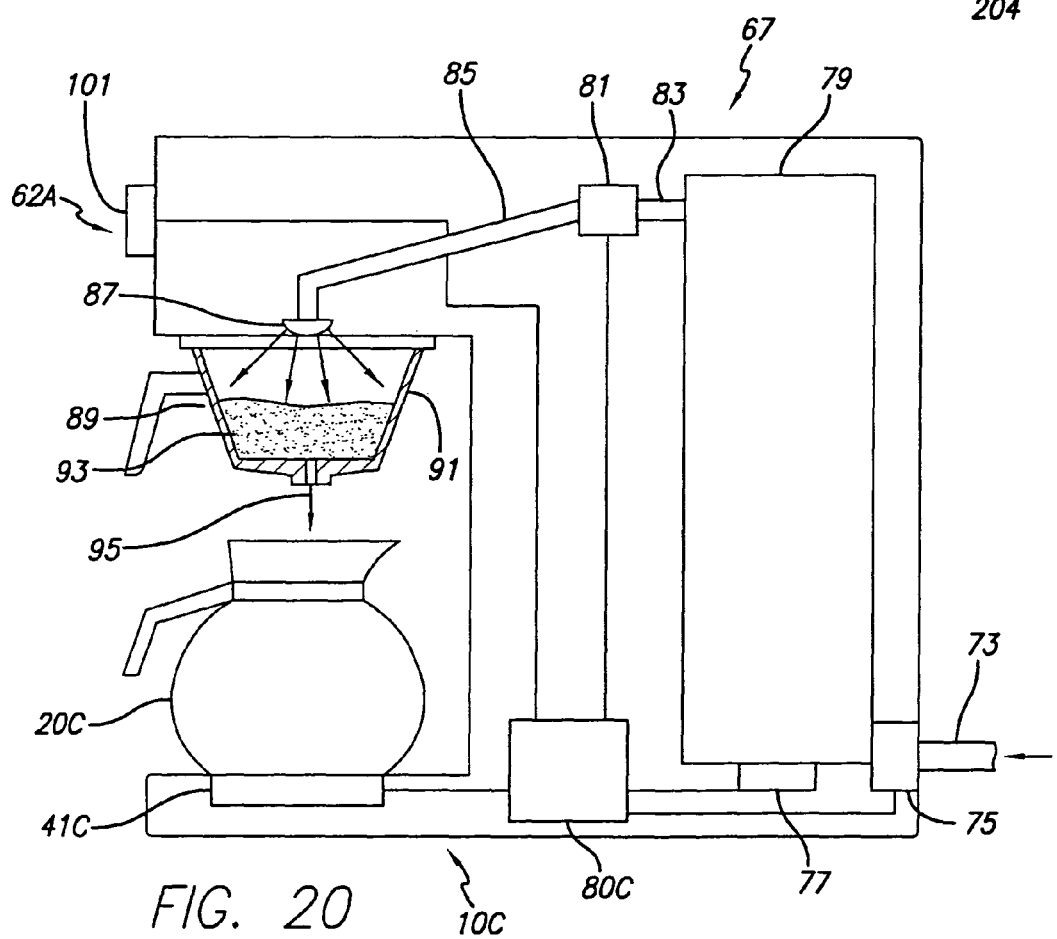

TEMPERATURE CONTROL SYSTEM

RELATED APPLICATIONS

This Application is a U.S. Nationalization of PCT Application No. PCT/US03/22338, filed Jul. 16, 2003, which claims priority to U.S. Provisional Patent Application 60/396,505 filed Jul. 16, 2002. The prior applications are expressly incorporated herein by reference in their entirety.

BACKGROUND

The present disclosure relates to a temperature control system, method and apparatus. More specifically, a system, method and apparatus for controlling a range of temperature attributes of a beverage contained within a server or reservoir is disclosed.

The correct temperature of a beverage at the time of dispensing from a server has been a subject of interest in the food service industry. Whether in a home, office, restaurant or retail setting, a beverage consumer has expectations that hot and cold beverages will be provided or otherwise dispensed within certain temperature ranges. When a hot or cold beverage is served at too high or too low a temperature the resultant product may be undesirable.

In a retail setting, such as in a restaurant or store, a beverage consumer's displeasure may lead the consumer to discard the beverage and no longer purchase beverages from a particular vendor who sold the beverage, or the vendor may have to offer an alternative beverage. Either option is wasteful, not cost effective, and can be damaging to consumer relationships.

As with other food products, hot beverages such as coffee or tea have a period of time or "life" during which flavor characteristics are optimal or at least desirable. Various factors can influence the "life". For example, it might be possible to extend the life of a heated beverage by reducing evaporation due to exposure of the beverage to the atmosphere, regulating the temperature of the beverage, and preventing overheating or "cooking" of the beverage.

Attempts have been made to extend the "life" of a heated beverage retained in a server by regulating the temperature of beverage in the server. One form of beverage server utilizes heat resistant and heat conductive material for a beverage reservoir. A flame from a source such as a gelled fuel is placed under the reservoir to heat the beverage contained therein. This arrangement may not be preferred because the flame does not provide uniform or controllable heating of the beverage in relation to the quantity of beverage retained in the server, the amount of fuel, the temperature of the fuel, and other factors.

Warming plates have been used to keep beverages such as coffee hot. Such warming plates can be an improvement over the exposed flame systems in that the plates generally produce more consistent heat at a generally constant power level. However, such warming plates generally have not been controllable and have a tendency to result in cooking of the coffee.

In addition to applying heat to a beverage, other methods of regulating the temperature of a stored beverage have been employed. Passive servers, such as those which use insulated reservoirs, for example, glass, or metal insulated thermal servers, have been used to prevent heat loss of a beverage after the heated beverage is placed within the reservoir. Some degree of heat loss still occurs despite the use of insulation and as a result, the beverage may only be kept at a desired temperature for a limited period of time.

Based on the above information and other reasons which may not have been mentioned, there exists a need for a temperature control system, method and apparatus which can be used to extend the duration and consistency of the life of a beverage within a beverage server by controlling various factors associated with a the temperature of a beverage.

The present disclosure envisions a temperature control system, method and apparatus employing at least a controller and a temperature control assembly which work in combination with each other to facilitate control of numerous temperature attributes of an associated beverage contained within a beverage server. The temperature control system should be capable of working in conjunction with a beverage maker or a remote station for serving a beverage away from the beverage maker.

Additional features will become apparent to those skilled in the art upon consideration of the following detailed description of the drawings illustrating at least one embodiment of the disclosure. Additional features will become apparent to those skilled in the art upon consideration of the following detailed description of the drawings.

BRIEF DESCRIPTION OF THE DRAWINGS

FIG. 1 is a diagrammatic cross-sectional view of a beverage server;

FIG. 2 is a partial fragmentary cross-section view taken along line 2-2 in FIG. 1 showing a bottom portion of the beverage server;

FIGS. 10-19 are timing diagrams or methods of applying heat in a temperature control system as disclosed; and FIG. 20 is another embodiment of the temperature control system of the present disclosure in use with a carafe-style beverage server.

DETAILED DESCRIPTION

Figure 4:
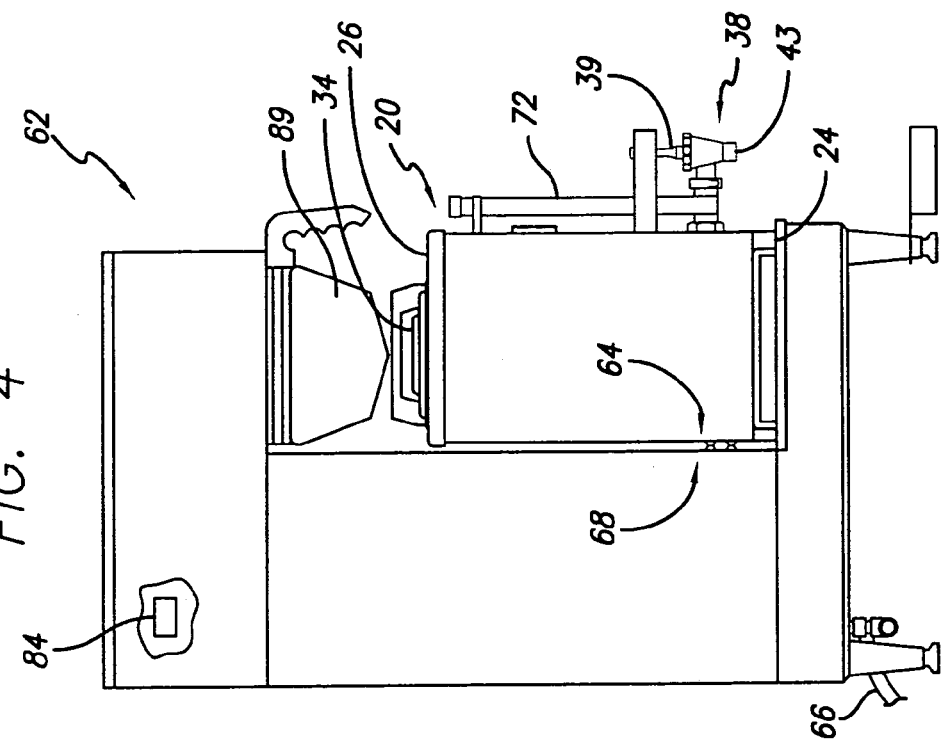
FIG. 4 is a side elevational view of the beverage maker and server combination shown in FIG. 3.

While the present disclosure may be susceptible to embodiment in different forms, there is shown in the drawings, and herein will be described in detail, embodiments with the understanding that the present description is to be considered an exemplification of the principles of the disclosure and is not intended to limit the disclosure to the details of construction and the arrangements of components set forth in the following description or illustrated in the drawings.

Figure 3:
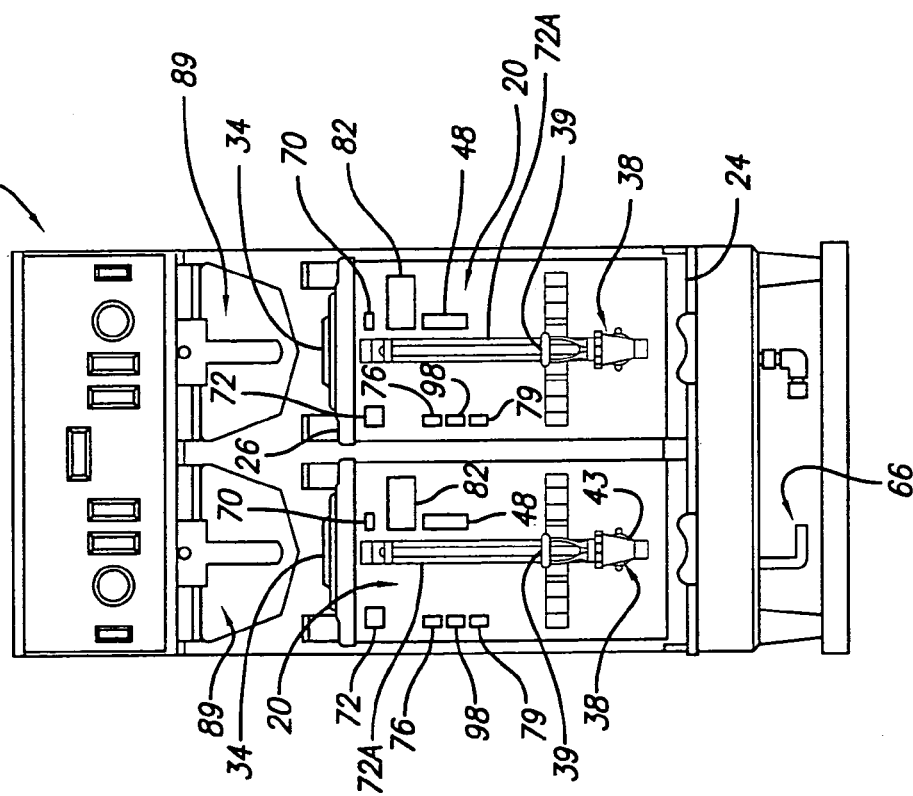
FIG. 3 is a front elevational view of the beverage server of FIG. 1 in which the beverage server is associated with a beverage maker.
Figure 5:
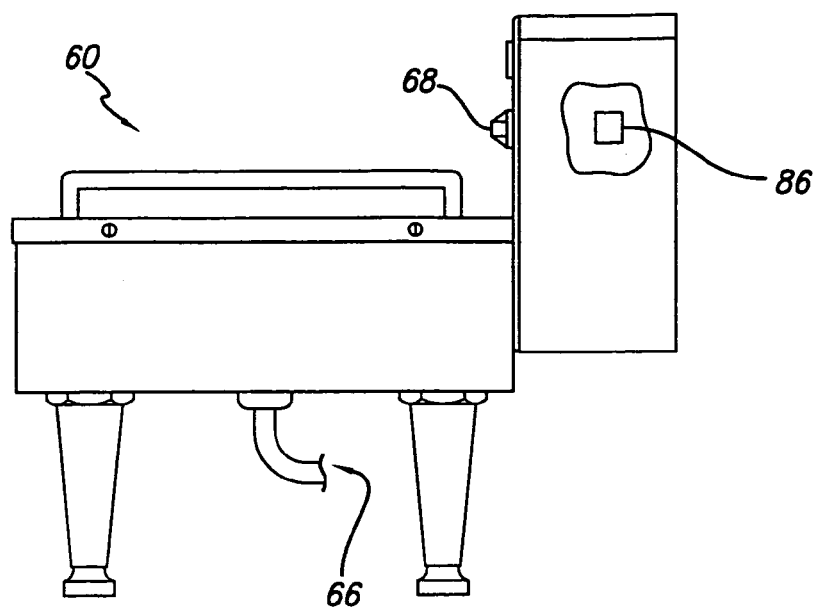
FIG. 5 is a side view of remote station for use with a server as disclosed.
Figure 6:
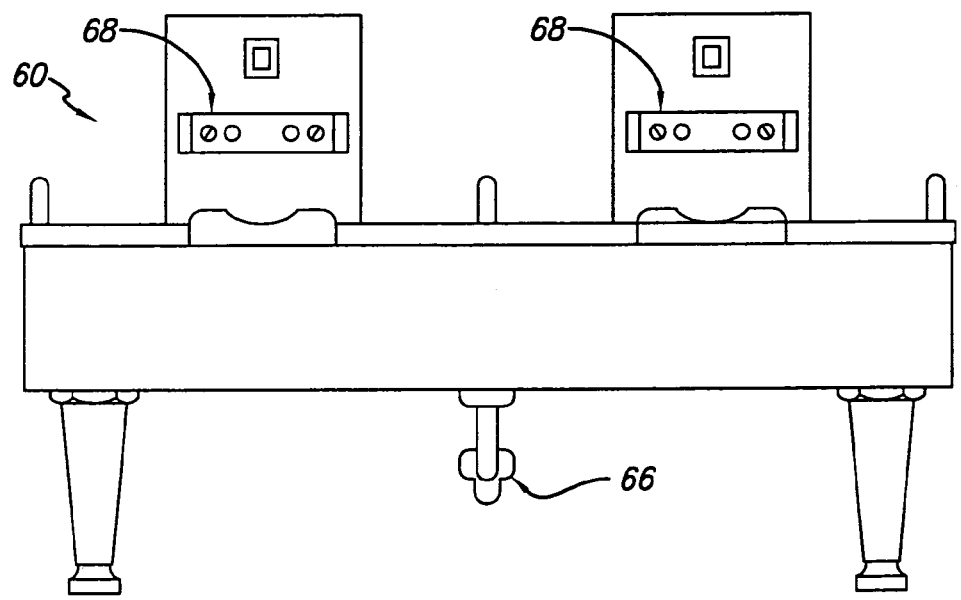
FIG. 6 is a front elevational view of the remote station as shown in FIG. 5.

The present disclosure describes a temperature control system 10 for use with a beverage server 20 which allows for control of a plurality of temperature attributes of a beverage at its location of making, during storage, and at a remote dispensing site. The beverage server 20 may be used as a stand-alone unit as shown in FIG. 1. Additionally, the beverage server 20 may be used in combination with a brewer or beverage maker 62 as shown in FIGS. 3 and 4, or in combination with a remote dispensing station or remote station 60 such as is shown in FIGS. 5 and 6. The remote station 60 as shown without the server positioned thereon but it is envisioned that one of skill in the art will appreciate that the server may be positioned on the remote station 60 similar to that as shown in FIGS. 3 and 4 in which the server is attached, positioned or docked to the beverage maker 62. An indicator 70 is provided on beverage server 20 to indicate over line 71 when a connection exists between the beverage server 20 and either a beverage maker 62 or a remote station 60. U.S. Pat. No. 6,070,771 issued Jun. 6, 2000, U.S. Pat. No. 6,089,409 issued Jul. 18, 2000 and U.S. Pat. No. 6,393,966 issued May 28, 2002 provide additional information related to the use of a beverage server in combination with a beverage maker and a remote station. The aforementioned U.S. Patents are incorporated herein by reference in their entirety. These aforementioned patents are also assigned to the assignee of the present application.

The term beverage as used herein is intended to be broadly defined and interpreted. As used herein, beverage is intended to include to all consumable liquids, including but not limited to coffees, teas, hot chocolate, juices, flavored drinks, soups, au jus, gravy and any other consumable liquids for which a desired serving temperature is to be provided and maintained.

As shown in FIG. 1, one embodiment of the beverage server 20 is comprised of a housing 21 including generally vertical side wall 22, a bottom portion 24 and a top portion 26. The housing 21, vertical side wall 22, bottom portion 24 and top portion 26 form a generally hollow structure defining an interior cavity or chamber 28. It is contemplated that other geometric structures such as a cylinder or other suitable shape may be used to accomplish the same or similar function of the beverage server 20. A reservoir structure 11 defining a reservoir cavity 13 in which the beverage is retained. Beverage retained in the reservoir 11 contacts in internal surface 15 of the reservoir. This internal surface 15 can be controllably heated as will be described herein to impart heat energy to the beverage.

Insulation 27 is provided to decrease heat loss to the environment. An example of an insulation which could be used in the embodiment as shown in the figures is a polyurethane expanded foam insulation. It is expected that one of ordinary skill in the art will be able to choose from a variety of insulation materials suitable for a desired set of conditions. Insulation 27 is provided not only between the generally vertical wall 22 but also over the top portion 26 of the interior cavity 28. The insulation 27 in the area above the interior cavity 28 has a thickness dimension 23 which is generally greater than a thickness dimension 25 of the vertical side wall 22. It should be noted that the thickness description above refers to heat retaining characteristics. If a thin high heat retention insulation is used above the interior cavity 28, then it may be thinner than a different insulation having a lower heat retention characteristic used in the vertical side walls 22. The type of server shown in FIGS. 1-4 and 7, 8 is a thermally insulated or thermal server or dispenser of generally known construction such as SoftHeat® servers as provided by Bunn-O-Matic Corporation, Springfield, Ill. The additional structures, methods of use and controls in combination with such a SoftHeat® server is further disclosed herein.

The top portion 26 is dimensioned to contain at least one aperture 30 through which a beverage 32 may be introduced into the interior cavity 28 and provide access for cleaning. It is contemplated that aperture 30 may be at least partially occluded or sealed by a lid 34. The lid 34 may be attached to the aperture after beverage 32 is introduced into the interior cavity 28. The lid 34 also may be present while beverage 32 is being introduced into the interior cavity 28. The lid 34 may be designed so as to allow a beverage 32 to flow through the lid 34 into interior cavity 28. For example, a "Safety-Fresh®" container and lid such as is produced by Bunn-O-Matic Corporation, Springfield, Ill., and as set forth in U.S. Pat. Nos. 4,739,898 and 5,480,054 and assigned to the assignee of the present application which are incorporated herein by reference, in their entirety may be used.

At least one outlet aperture or serving port 36 is provided on the beverage server 20. the serving port or outlet aperture 36 extends through the reservoir 11 and housing 21. As shown in FIG. 1, the outlet aperture 36 is located generally near the bottom portion 24 of beverage server 20 either on the bottom of the server 20 or on a wall 22 of the server. The outlet aperture 36 is in communication with a serving valve or faucet 38. The serving valve 38 may be any manually or automatically controllable valve known to those of skill in the art. For example, the server valve 38 may be of the manual form such as shown in the figures in which a handle 39 is actuated to place a valve structure within the valve 38 to dispense liquid from the outlet aperture 36 and through the nozzle 43. Additionally, it is envisioned that an electronically controlled valve such as an electronic dispensing valve may be coupled to the controller 80 such that a push button selection or operation of a manual handle will provide a signal to the controller instructing the valve to be operated and control and dispense beverage therethrough. It is contemplated that the serving valve 38 may be manually controllable by a user of the beverage server 20 or may be controlled by a controller 80. The controller 80 may further operate serving valve 38 in response to a preprogrammed series of signals such as the amount of time the serving valve 38 is to remain open or any other signal desired by the user.

The controller 80 may be responsive to a signal from a control panel 82 such as a switch, push button, numeric keypad, or any other suitable selectable control apparatus known to those of skill in the art. Such a control panel 82 may be used to program the controller 80 of the temperature control system 10 to input control information and signals. Additionally, other methods and devices may be used to input control information. For example, the information may be programmed via the coupling or connector 64. In this example, the information may be transmitted to the controller 80 from the brewer, station 60 or other device coupled to the connector 64. Additionally, other devices including conductive, inductive, RF wireless, and other communication devices are envisioned to be included in the means for programming the temperature control system 10.

With reference to FIG. 2, many of the same features shown in FIG. 1 are illustrated. The controller 80 is shown as a circuit board including various components for operating the temperature control system 10 of the present invention. A timer of know construction is included with the controller 80 to provide a program or operating time reference for purposes of operating the controller and the associated components as described herein. One of skill in the art will appreciate how to employ a timer in conjunction with the present disclosure to provide a means for time controlling at least a portion of the operation of the controllable heating methods disclosed herein.

The controller 80 may be carried in the brewer 62, 62A shown for illustrative purposes only as controller 84 in the partial fragmentary section of FIG. 4 to indicate that the controller 84 is carried on the brewer. Additionally, a controller 80 is shown illustratively in FIG. 5 as controller 86 in the partial fragmentary area of the remote station 60 as shown in FIG. 5. As such, the embodiment of the server 20 with all of the displays, controls and other components may not be required in each and every situation.

The bottom cross section view in FIG. 2 taken along line 2-2 in FIG. 1 is shown without the faucet 38 and other structures on the front face of the server. This has been eliminate for purposes of clarity in describing the structures and components as shown in the bottom cross-sectional view.

One of ordinary skill in the art provided with the disclosure provided herein will be able to construct and program a controller 80 based on known components. For example, the connector 64 and the coupling of the server with a brewer or remote station (brewer as shown in FIGS. 3 and 4, remote station 60 as shown in FIGS. 5 and 6) is shown and described in the patents identified herein above and incorporated herein by reference.

Turning to temperature control system 10 of the present disclosure, FIG. 1 shows controller 80 on beverage server 20. It is contemplated that controller 80 may be located anywhere on or in beverage server 20. The controller 80 may alternatively be a separate unit coupled to the beverage server, a beverage maker or a remote station for example, for purposes of retrofitting a server, a beverage maker or a remote station. It is further contemplated that controller 80 may also operate a plurality of beverage servers 20. Further, as shown in FIGS. 3 and 5, controller 80 may operate as part of or in combination with beverage maker controller 84 or remote station controller 86 to allow for control of all temperature attributes of beverage 32 within beverage server 20 at one or a plurality of locations.

An alternative embodiment contemplates a beverage maker controller 84 or a remote station controller 86 controlling a beverage server 20. In this embodiment, the controller 80 on beverage server 20 might not be necessary.

Controller 80 may control temperature control assembly 40 over line 42. A feedback to controller 80 is provided over line 44 from the temperature sensing device 46. The temperature sensing device 46 may take the form of any temperature sensing or detecting device known in the art, for example a thermostat as shown herein.

As shown in FIG. 1, temperature control assembly 40 includes a heating element 41 located generally proximate to bottom portion 24. However, it is contemplated that the heating element 41 may be a electrical, thermo-chemical reaction chamber, steam transfer structure, hot water filled structure, phase changing exothermic or endothermic material, light or infrared source, microwave source or any device known to those of skill in the art for adding energy to or removing energy from a liquid.

The heating element 41 illustrated is an active heating element in that it receives energy and transfers the energy to the beverage through the reservoir. The active heating element is generally retained in the server chamber 28 such as the blanket or sheet heater as is shown in FIG. 2. The heater 41 may also be placed in the cavity 13 of the reservoir 11 using heating elements of known construction.

It is also envisioned that a passive heating element could be used for the heating element 41. A passive heating element is charged with energy or heat and positioned in close proximity to or contact with the beverage. The passive heating element then dissipates heat to the beverage to maintain a level of heat in the beverage.

It is also contemplated that temperature control assembly 40 may be designed to remove heat energy from a liquid thereby keeping a cold beverage cool. In this application, temperature control system 40 may include a cooling element 41a such as a Peltier device, a conventional compressor/coolant refrigeration system, or any other device known to those of skill in the art.

Figure 7:
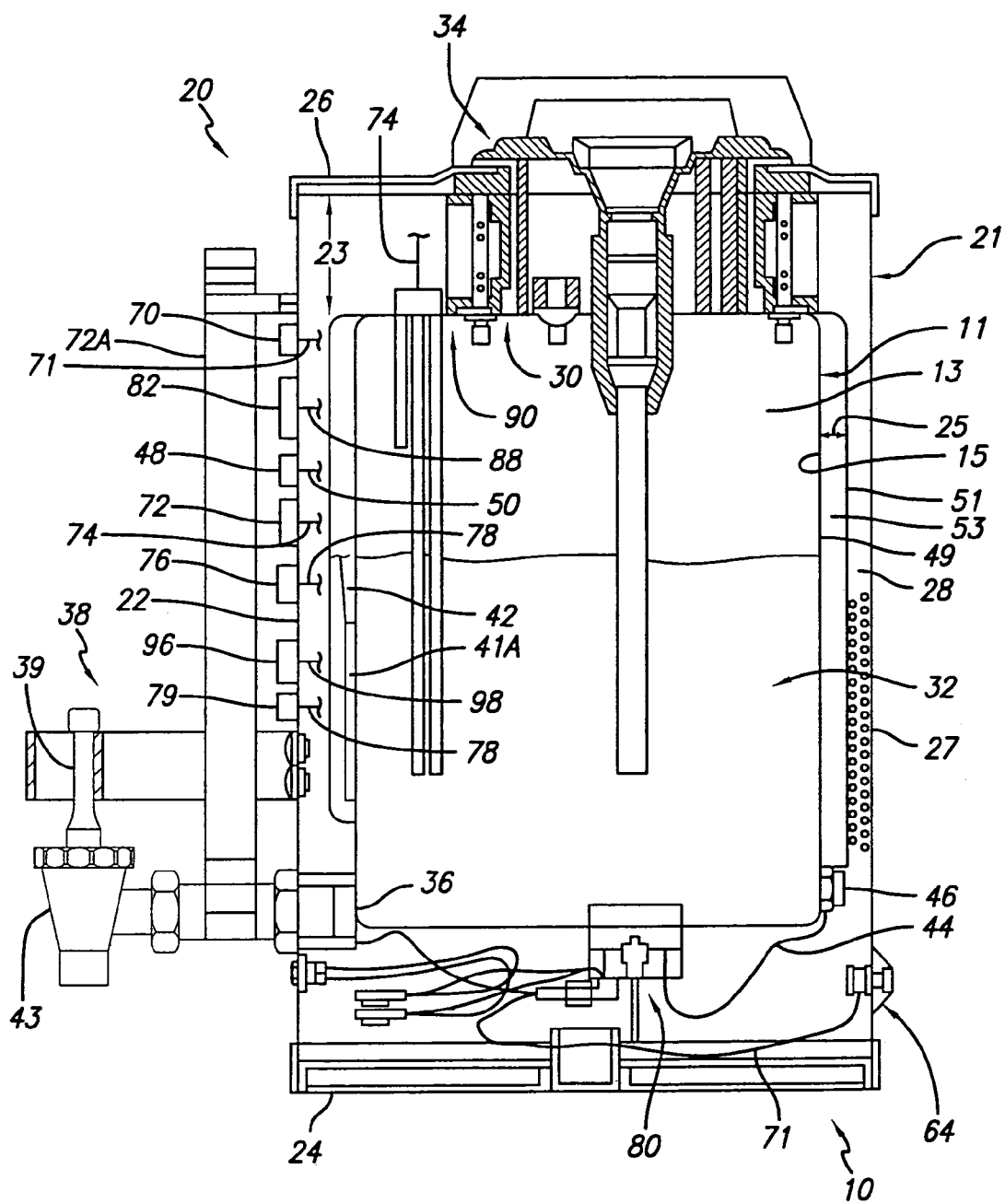
FIG. 7 is a diagrammatic cross-sectional view of the beverage server of FIG. 1 showing another embodiment of the temperature control system.
Figure 8:
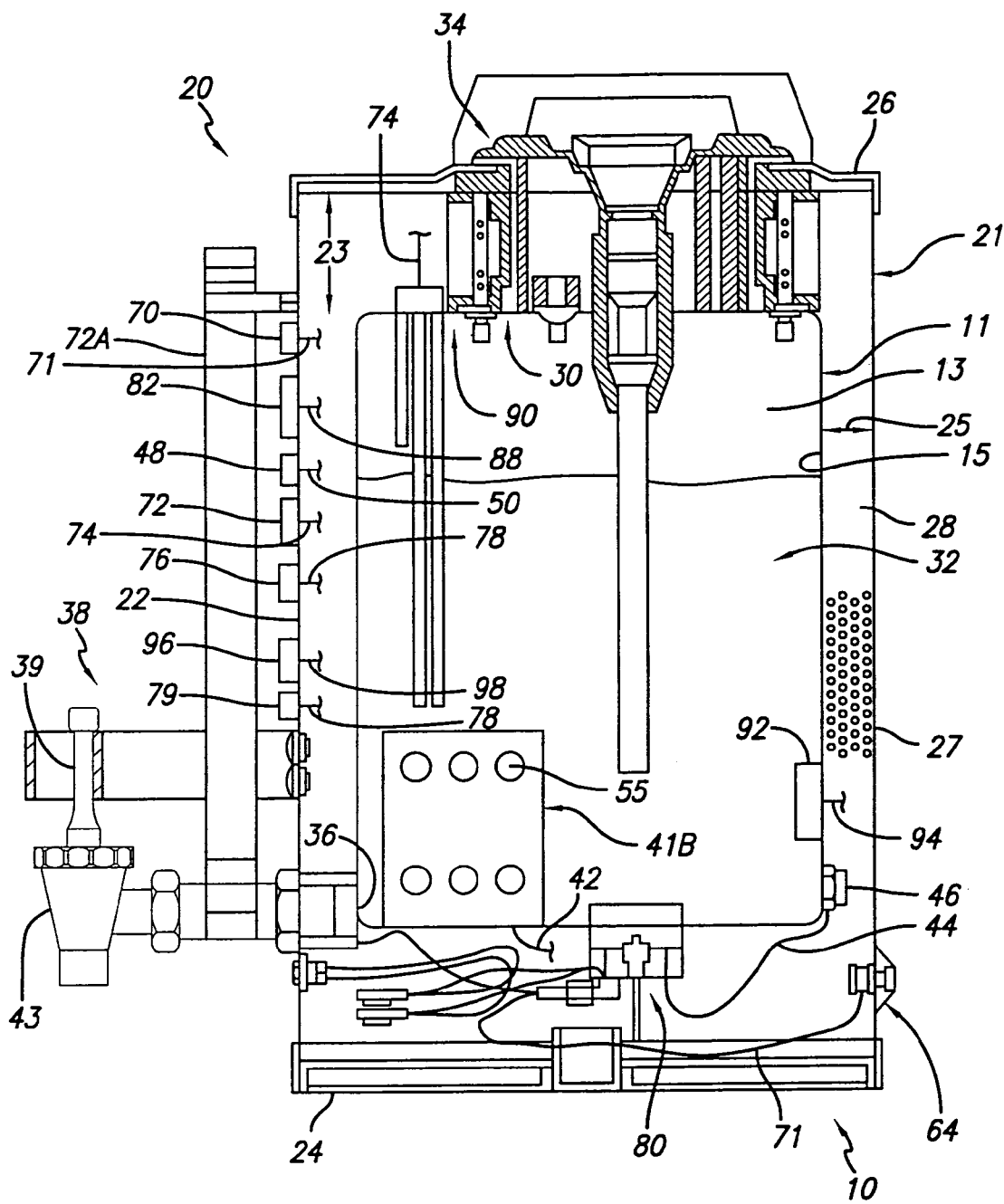
FIG. 8 is a diagrammatic cross-sectional view of the beverage server of FIG. 1 showing another embodiment of the temperature control system.
Figure 9:
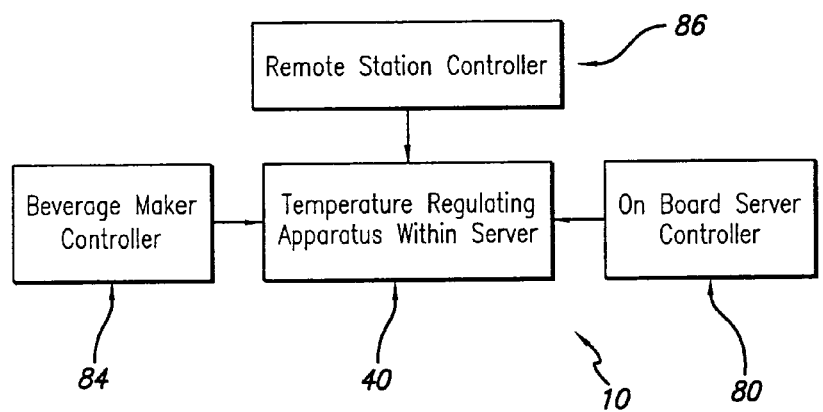
FIG. 9 is a diagrammatic representation of the temperature control system showing interaction of the various components.

FIGS. 7 and 8 show additional embodiments and locations of heating element 41 of the temperature control system 40. Turning to FIG. 7, heating element 41B is shown as a water jacket surrounding interior cavity 28. In this embodiment, beverage 32 is heated or cooled over a greater surface area from the perimeter of interior beverage 32. Such a water jacket may be defined by a cavity formed between the exterior surface 49 and the interior cavity 28 and a second wall 51. Water or any other suitable material can be placed in the resulting cavity 53 providing heat transfer to the beverage 32. In this embodiment, a heating element 41a is provided in the form of a strip or blanket heater which heats a portion of the material in the cavity 53. Circulation of the material in the cavity provides heat transfer to the beverage 32. Alternatively, a blanket heater may be wrapped around the entire wall 51 to heat the material within the cavity 53.

FIG. 8 shows another embodiment in which heating element 41 is a structure protruding into the center of interior cavity 28. In this embodiment, beverage 32 is again heated over a greater surface area. The heating element 41b as shown in FIG. 8 includes holes 55 to allow the passage of beverage 32 therethrough. In this manner, a larger heating surface is provided with the benefit of the holes 55 to allow convection flow therethrough.

As an additional consideration, a circulating apparatus 92 may be provided, coupled over line 94 to controller 80. The circulating apparatus 92 may be any mechanical means, for example, a pump or a blade, which can circulate the beverage contained within beverage server 20. The circulation created by circulation apparatus 92 may allow for more even heating of the beverage by temperature control system 40. Generally, in the absence of circulating apparatus, heat energy will be circulated through the beverage by means of convection currents in the beverage which result from the heating process.

In any embodiment, temperature control system 40 includes and is controlled by controller 80. Controller 80 may be preprogrammed for a series of activations and deactivations over a range of temperatures and conditions, which when communicated over line 42, activate or deactivate, energize and deenergize the temperature control system 40.

For example, controller 80 may be preprogrammed by the manufacturer to maintain beverage 32 contained within beverage server 20 at a certain temperature. When beverage 32 is introduced to interior cavity 28 of beverage server 20, the temperature sensor 46 measures, senses or detects temperature and communicates that measurement over line 44 to controller 80. The temperature sensor 46 may be positioned proximate to the outlet port 36 as shown in FIG. 7 or may be positioned in a different location relative to the server as shown in FIG. 8. If the temperature measured by the temperature sensor 46 is lower than the preprogrammed temperature value or range, controller 80 sends a signal over line 42 to activate temperature control assembly 40. In this example, as the heating element 41 adds heat energy to beverage 32, the temperature sensor 46 measures the temperature and communicates the measurements signal or information over line 44 to controller 80. After the temperature sensor 46 measures and communicates a temperature measurement to controller 80 which meets or exceeds the preprogrammed temperature, controller 80 sends a signal over line 42 to deactivate heating element. The controller is also capable of creating a trend of temperature information to help the system to "anticipate" when a desired temperature is being approached so as to not overheat the beverage.

Through a series of measurements, activations and deactivations, the temperature control system 40 regulates the temperature of beverage 32 contained within beverage server 20. The objective of this improved control of the temperature of the beverage, server and other portions and variables in the system is to minimize the amount of heat or energy that is added to the beverage in order to maintain the optimal serving temperature and flavor and minimize any potential adverse effect of heat on the beverage.

It is also contemplated that the controller 80 may control heating element 41 to engage at various levels of heat output from nominal heat output to full heat output. Further, it is contemplated that controller 80 may activate and deactivate heating element 41 to cycle the heat on and off allowing for pulses of heat at any of the various levels of heat output. These various levels of heat output and various time intervals of heat output will give the user a broader range of control of the temperature attributes of beverage 32 and help prevent overheating or "cooking" of the beverage 32.

For example, in a situation such as a banquet or a conference, where a large volume of beverage needs to be made in advance and then be dispensed at a later time it may be desirable for the temperature control assembly 40 to operate at a constant reduced heat output level until the beverage is to be served. Then, while the beverage is being served, it may be desirable for the heating element 41 to operate at the highest possible heat output level. This may be necessary to compensate for heat loss which may occur during dispensing as the result of atmosphere transfer as beverage is dispensed. For example, when the beverage is held in the server prior to dispensing the heat loss is relatively slow. However, as the beverage is dispensed the heat transfer rate increases. Heat transfer or heat loss increases as a result of atmosphere being introduced into the container as beverage is dispensed. The system can be programmed to compensate for the increased rate of heat transfer, for example, by detecting an increase in dispense rate and adding heat to the server in response to the detected dispense rate increase.

In another situation, where for example a beverage is introduced into the beverage server 20 at a temperature below optimum serving temperature, it may be desirable for the heating element 41 to operate at a highest possible heat output level for a period of time to raise the temperature of the beverage as rapidly as possible to the desired serving temperature and then cycle off. As the beverage sits in the beverage server 20 over time, it may then be desirable to have the heating element 41 cycle on and off for short periods of time or bursts to intermittently warm the beverage. Or, it may be preferred to have the heating element 41 constantly operate at a lower heat output level, thus maintaining a generally constant temperature of the beverage.

Yet another feature of the present disclosure is the ability to control the interior temperature of a beverage server 20 prior to introduction of a beverage into the interior cavity 28 of beverage server 20. When a beverage is made, it is oftentimes at the proper temperature for serving. However, when the beverage is introduced into a container of a different temperature, for example room temperature, the temperature of the beverage will change depending on the temperature of the container into which it was introduced. For example, if hot coffee were introduced into a room temperature container, the coffee would loose heat to the container and become cooler.

The present disclosure further contemplates a "preheat" operation. When a "preheat" operation is activated from the control panel 82, or automatically upon initiating a brew cycle, controller 80 activates heating element 41. The preheat operation may be manually operated or a preprogrammed operation of the system. In response to signals from the temperature sensor 46, controller 80 then operates heating element 41 at a predetermined heat output level until a proper predetermined temperature or user selected temperature is achieved. Prior to the desired preheat temperature being achieved, the controller 80 may lock out the beverage maker 62 to prevent beverage making at the maker 62 and dispensing into the server. The lock out feature may be of any method or combination or methods. For example, the lock out may lock out the brewing mechanism to prevent brewing prior to attaining "pre-heat" levels. After the desired temperature is attained, controller 80 may then communicate with beverage maker 62 to indicate that beverage maker 62 may then begin a beverage making cycle.

It is envisioned that the "preheat" operation be user selectable or programmable as to both duration and temperature. Further, an override may be provided. For example, in a high volume output situation, a beverage server 20 may be returned to the beverage maker 62 to be replenished with fresh beverage. It is likely that if the entire contents of beverage server 20 were depleted rapidly, the beverage server 20 would already be at or near the temperature of the beverage to be introduced into the beverage server. In such a scenario, it may be desirable to override any preprogrammed "preheat" operation and immediately introduce beverage into the beverage server 20. Also, in this situation, the internal server temperature may be sensed, the heater activated to bring the server up to temperature and then allow beverage to be dispensed therein.

Another aspect of the temperature control system 10 of the present disclosure is to provide a variety of control options. It is envisioned that a purchaser of the temperature control system 10 as a system to connect to existing equipment, or the server 20 having the system 10, may purchase the system from the manufacturer with temperature attributes preprogrammed into the memory of the controller 80. The preprogrammed temperature attributes could be based on predetermined general settings or could be dependant on the type of beverage for which the system was to be used to control temperature. Such predetermined general setting could be established by the manufacturer or the customer. For example, it is envisioned that a customer ordering a quantity of servers may specify one or more of the attributes to be preprogrammed. Such a customer might be a franchise operation seeking to attain uniformity across its franchises.

It is also contemplated that the purchaser of the temperature control system 10 may wish to customize the preprogrammed temperature attributes. For example, a large restaurant, or food-service company with nationwide or worldwide locations may desire to ensure uniform beverage serving temperatures throughout its operations. In such a situation, the restaurant could provide temperature specifications to the manufacturer which could then be programmed into the memory of the controller 80 of the temperature control system 10, thus creating a uniform beverage dispensing temperature customized to the particular user.

Further, a variety of beverages may be dispensed from the same beverage server 20 at different times. In such an application, it may be desirable to select a unique temperature for each beverage to be served. It is envisioned that control panel 82 may contain a variety of indicators and selectors which would allow a user to select a type of beverage. The user selection would allow the controller 80 to regulate the temperature attributes assigned to the selected beverage.

For example, if coffee and hot chocolate were two possible choices of beverages to be contained within a particular beverage server 20, two different temperatures or temperature ranges may be required. It may be determined that it is desirable to serve the coffee at a serving temperature of 185° F.±5° F. However, it may be desirable to serve the hot chocolate at a reduced temperature for example a temperature of 170° F.±5° F. because hot chocolate might be likely to be consumed by young children who may be more sensitive to heat or if it is determined that the optimal temperature for optimal flavor of hot chocolate is different than coffee or tea.

Yet another possible control option is to provide an end user with the ability to directly control the temperature of the beverage contained within the beverage server 20. In order to directly control the temperature of the beverage, a temperature display 48 is coupled to the temperature sensor 46 over line 50. Temperature display 48 may also receive the temperature data from controller 80. The temperature display 48 may take the form of an LCD display, mechanical temperature gage, temperature responsive material, or any other means of indicating temperature known to those of skill in the art.

After viewing the current temperature of a beverage contained within a beverage server 20, the user may then select a different temperature by entering the different temperature on the control panel 82. The different temperature would then be communicated to the controller 80 over line 88. The controller 80 could then respond by activating or deactivating the heating element 41 to either increase or decrease the temperature of the beverage within beverage server 20.

In addition to being part of an end user control option, the temperature display 48 also may serve a marketing purpose, in that end users may prefer to see the temperature of the beverage they are about to dispense from the beverage server 20. This may be desirable when an end user is cold and wishes to warm themselves with a hot beverage. Seeing the temperature of the beverage may have a psychological impact on the end user's decision to purchase a particular beverage.

Beyond marketing, the temperature display 48 also allows for easy monitoring of the temperature of the beverage contained within a particular beverage server 20. For example, a store clerk can visually verify that a beverage contained within a particular beverage server 20 is within a particular serving temperature range specified for the particular beverage.

As an additional consideration, the temperature control system 10 as shown in FIGS. 1, 3, and 5 provides temperature control for a beverage contained within beverage server 20 at a plurality of locations. As shown in the figures, a connector 64 is provided on beverage server 20 as a means for placing beverage server 20 in communication with a beverage maker 62, a remote station 60, or a power supply 66. In a stand alone operation, when the beverage server 20 is not in communication with either a beverage maker 62, or a remote station 60, the temperature control system 10 may still provide all the functions described above.

U.S. Pat. No. 6,070,771 issued Jun. 6, 2000, U.S. Pat. No. 6,089,409 issued Jun. 18, 2000, and U.S. Pat. No. 6,393,966 issued May 28, 2002 are incorporated herein by reference in their entirety.

In order to accomplish the above mentioned functions, a power source 66 must be provided. The power source may be in the form of a matching connector 68 coupled to a standard household 110 VAC power cord or a 12 volt vehicular power socket, an onboard battery pack coupled to the beverage server either directly or by a matching connector 68, an onboard fuel cell coupled to the beverage server either directly or by a matching connector 68, an external battery pack or fuel cell coupled to the beverage server by a matching connector, or any other power source known to those of skill in the art.

This wide range of power options will allow the temperature control system 10 to keep beverages at a desired temperature in a variety of applications such as in a restaurant service area where a remote station is not feasible due to space constraints but 110 VAC power is available, an outdoor catering setting where no external power is available, or in an disaster relief vehicle where battery power is available.

As shown and described with reference to FIGS. 5 and 6, the temperature control system 10 is capable of operating in combination with a beverage maker 62. When used in combination with a beverage maker 62, temperature control system 10 is coupled to beverage maker 62 by connectors 64 and 68 over line 71. Connectors 64 and 68 provide power to temperature control system 10 and also allow for communication between controller 80 and beverage maker controller 84. It is contemplated that controller 80 and beverage maker controller 84 may integrate their respective control features or alternatively be selectively overrideable by either the controller 80 or beverage maker controller 84.

As shown in FIG. 5, temperature control system 10 is capable of operating in combination with remote station 60. When used in combination with a remote station 60, temperature control system 10 is coupled to remote station 60 by connectors 64 and 68 over line 71. Connectors 64 and 68 provide power to temperature control system 10 and also allow for communication between controller 80 and remote station controller 86. It is contemplated that controller 80 and remote station controller 86 may integrate their respective control features or alternatively be selectively overrideable by either the controller 80 or remote station controller 86.

Remote station 60 or a plurality of remote stations 60 may be permanently; installed into a location such as a service countertop in a catering hall. By permanently installing remote stations 60 into a service countertop the appearance of a beverage serving station is improved because no equipment or electric wiring is visible to clutter a countertop surface. In such a situation, the installed remote stations 60 may be capable of receiving any number of beverage servers 20. This may be desirable for any situation in which a customized beverage serving situation is required.

With the foregoing in mind and further disclosure provided herein, it is envisioned that the server can be provided with a controller as well as the brewer and remote station. In this regard, the server can act independently, can be controlled by the brewer and any information which may have been updated at the brewer, and may be controlled by the remote station and any other specific information related to use of the server at a remote station. In this regard, the system can be designed to provide a high degree of flexibility to accommodate specific needs at any one of a variety of locations.

It is also envisioned that the temperature control system 10 can be embodied in a beverage maker or brewer 62a as shown in FIG. 20. Such a brewer is of generally known construction such that it includes a heated water dispensing system 67. The heated water dispensing system 67 includes a heated water reservoir 79 coupled to an inlet line 73 having a controllable valve 75 to controllably admit water to the reservoir and a controllable outlet valve 81 connected to an outlet port 83 of the reservoir 79. The outlet valve 81 is coupled to the controller 80c. Further included in the heated water dispensing system is a dispense line 85 for passing liquid dispensed from the reservoir 79 to a sprayhead 87. A heating element 77 is provided for the reservoir 79 and coupled to a controller 80c.

Controlled dispensing through the sprayhead 87 delivers water to a brewing funnel 89 including a filter 91 which contains a brewing substance 93. A brewed beverage 95 can be dispensed from the funnel 89 to a carafe 20c. A heating element 41c is coupled to the controller 80c for controllably regulating heat provided to the carafe 20c. The carafe 20c is yet another form of server 20. The carafe 20c is an example of using the temperature control system with a generally non-insulated server or dispenser.

It is envisioned that the controller 80c shown in FIG. 20 coupled to the brewer 62a provides the functions of the temperature control system 10c. The embodiment as shown in FIG. 20 can provide the heating functions as described throughout the present application. In this regard, the warmer 41c can be used to preheat the server 20c at the initiation of a brewing cycle when switch 101 is activated sending a signal to controller 80c to initiate sequences used to control the controllable valve 75, 81 during the brewing process. The warmer 41c coupled to the controller 80c can be used to provide heat to the server 20c during and after the brewing process and terminate heat after a predetermined period of time.

Additionally, as described in greater detail throughout this application the warmer 41c can be controllably activated and deactivated (turned on and off) to provide pulses of heat in a variety of selectable patterns over a period of time. The period of time may be defined between brew cycle activations such that activation of switch 101 indicates to the controller 80c that a new brew cycle has been initiated and that the preprogrammed temperature control system 10c should be reinitiated or otherwise restarted. The heater 41c can be positioned at the remote dispensing station 60 as shown in FIGS. 5 and 6 to provide the controlled heating system and functions as described herein.

As an additional consideration, a beverage may be made directly in beverage server 20 without the need for beverage server 20 to be brought into proximity with beverage maker 62. By allowing for independent operation of temperature control system 10, beverage server 20 can act as a mixing container for a beverage. For example, any number of liquid or powdered concentrates, such as coffee concentrate may be introduced into interior cavity 28 of beverage server 20. Water may then be added in a desired quantity. A user may then select a desired temperature from the control panel 82. After selecting a desired temperature, the beverage server 20 may be left until the temperature control system 10 has caused the beverage contained within the beverage server 20 to reach the desired temperature, at which time the beverage may be served.

A volume display 72 may also be located on beverage server 20. The volume display 72 may take the form of a sight gage (shown as 72a in the drawings), LCD readout, series of indicators, or any other means of displaying volume known to those of skill in the art. The electronic version of the volume display 72 is coupled over line 74 to sensor 90 contained within interior cavity 28. It is envisioned that the sensor 90 could be external to the cavity 28 to sense the level of the contents, such as using an ultra sonic sensor or other non-invasive sensor. Sensor 90 may sense the level of beverage remaining within beverage server 20. Sensor 90 may be a conductive sensor, a plurality of conductive sensors, an optical sensor, or any other suitable sensing apparatus known to those of skill in the art. It is also contemplated that sensor 90 may be coupled to controller 80 and that volume display 72 may receive its information from controller 80.

The sensor 90 as shown in the figures is of a probe-type sensor. The probe-type sensor includes several probes, typically two long probes and a short probe to detect at least two levels in the server. Alternatively, individual probes may be placed on the side wall of the cavity to detect discreet levels.

A freshness timer 76 may also be located on the beverage server 20. The freshness timer 76 is coupled over line 78 to indicator 79 and is also be coupled to controller 80 over line 78. The freshness timer 76 can be embodied in the form of a control which can be set by the user, either in the form of a separate control or an integrated control in a general control panel. The freshness timer 76 is used to set a predetermined period of time to communicate the information to the controller for use in the pre-programmed or during programming the variables related to the temperature control system 10. After a predetermined period of time has elapsed from a preprogrammed event occurring, freshness timer 76 will activate indicator 79. The predetermined time may be user determinable and represent the maximum time at which a beverage may be served when flavor characteristics of the beverage are optimum. The freshness timer 76 may also respond to a change in temperature outside of a predetermined range or for a change in temperature which lasts for a predetermined time as an indicator that the beverage contained within beverage server 20 is no longer within serving parameters.

In addition to an indicator, it is also contemplated that freshness timer 76 may also be coupled to serving valve 38 or controller 80 and be capable of controllably closing serving valve 38 in response to the above mentioned events.

Another aspect of the present disclosure which falls under the category of temperature control is the ability to automatically power-off the system. In this embodiment, the controller 80 controls the heating element 41 in response to the predetermined time indicated by the freshness timer 76 or otherwise programmed into the controller 80. In this regard, the controller 80 terminates power to the heating element 41 after a preprogrammed or manually determined freshness period has expired. By terminating power to the heating element 41, overheating or "cooking" of the beverage is prevented. Terminating the heating of the beverage allows the beverage to "coast", or remain at a relatively high temperature for an extended period of time. This "coasting" is possible because of the thermal properties of beverage server 10, which prevent the beverage from rapidly cooling off. As noted with reference to FIG. 20 herein, the heating element 41c can also be terminated to prevent overheating or "cooking" of the coffee therein. While the properties of some of the carafe-style servers 20c may not be the same as those of other servers 20 which include insulation as described above, the posting period can extend the freshness and flavor time period of the beverage.

By preventing "cooking" of the beverage, the flavor characteristics of the beverage may be maintained for a longer period of time. In other words, it can be determined that the flavor characteristics of the coffee may be maintained for a period of, for example, twenty minutes. After the predetermined period of time, the continued heating of the coffee may cause some degradation of the flavor characteristics. By turning off the heat, the flavor characteristics can be extended. In other words, the heat is provided so long as, and in suitable pulses or does, to not significantly alter the characteristics of the beverage.

In combination with the thermal properties of the beverage server 20, a twenty minute period of time for retaining coffee may be extended to thirty minutes, forty minutes or more depending on the thermal properties of the server. It is envisioned that the heating time can be longer than 20 minutes, such as 1 hour at full heating capability or reduced heating capability. Additionally, further description will be provided with regard to various heating timing diagrams as found in FIGS. 10-19. In this regard, in each of the sequences disclosed in FIGS. 10-19 the controller 80 can terminate power to the heating element 41 at the end of a particular cycle allowing the beverage to slowly cool off or "coast" at the end of the cycle. Such coasting may result in dispensing a beverage product that is cooler than optimal serving temperature but will prevent transforming, via continued heating, the beverage into a product with an undesirable taste.

The freshness timer 76 will continue to countdown after the power has turned off which adds a further predetermined time the lockout feature mentioned above with regard to the valve 38 will be controllably operated. In other words, building upon the example provided above, the freshness timer 76 is initiated to allow the temperature control assembly 40 to operate for twenty minutes. After the twenty minute period has been reached, the controller 80 turns off the temperature control assembly 40 to prevent further heating of the coffee. The system of the present example has been studied and predetermined that the thermal characteristics of the server allow for an additional forty minutes of dispensing, under normal conditions, without detectable changes in the flavor characteristics or temperature of the coffee. The freshness timer 76 continues to count down for this forty minute period of time. After the additional forty minutes has expired, the controller 80 can be used to lock out the valve 38 to prevent dispensing from the beverage server 20. The controller 80 can then be used to activate an indicator which will indicate to a consumer as well as an operator of the equipment that a new batch of coffee needs to be brewed, because the beverage currently contained within the beverage server 20 no longer has the preprogrammed freshness characteristics.

When the beverage server 20 is prepared for receiving a new batch of coffee, the freshness timer 76 and automatic shutoff or lockout features need to be reset. The features can be reset as part of the initiation of the brewing cycle. For example, when the beverage server 20 is coupled to brewer 62 or if the beverage server 20 is stationed at the brewer 62, the freshness timer 76 component of the controller 80 is automatically reset by means of the programming operating the controller which may reset the freshness timer 76 and automatic shutoff features. This resetting can occur when power is removed from the beverage server 20 or upon activation of a brewing cycle. Resetting these features allows for new parameters relating to the freshness timer 76 and automatic shutout or lockout features to be reset depending upon the quantity of beverage to be produced, the type of beverage to be produced, and other factors which may have an effect on the freshness time of the beverage to be dispensed.

A beverage type indicator 96 may also be located on beverage server 20. It is envisioned that the beverage type indicator 96 is an independent indicator coupled to controller 80 over line 98. The beverage type indicator 96 may take the form of an LCD display screen, a series of indicator lights, or any other means of indicating known to those of skill in the art. The beverage type indicator 96 serves to inform a user as to the type of beverage contained within beverage server 20. For example, the beverage type indicator 96 may indicate that the beverage server 20 contains coffee, decaffeinated coffee, tea, or any other beverage. The beverage type indicator 96 may be set by any number of manual or automatic means. For example, a user may select the type of beverage to be made from control panel 82 or the type of beverage to be made may be detected by a sensor.

With reference to FIGS. 10-19 several illustrations of timing diagrams are provided. Timing diagrams provide a general graphic illustration of the methods of applying heat to a server using the temperature control system 80 of the present disclosure. Examples of times and time periods may be given but the timing diagrams provided herein are not limited to any specific time limitations. Rather, these timings diagrams are provided to provide illustrations which will be instructive to a user of the temperature control system disclosed herein.

Figure 10:
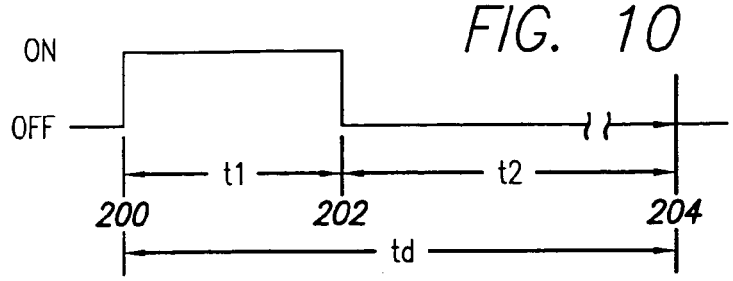

With regard to FIG. 10, the server starts out with no power to the heating element 41. At time 200 an activation event occurs such as initiating a brew cycle by operating a brew switch. Upon activation (200) the system applies heat "on" to the server for a predetermined period of time t1 or initial heating period. At the expiration of time t1, the heat is turned off (202). When the heat is turned off the beverage is allowed to cool "coast" for a period of time t2 since heat energy is no longer being added to the beverage.

At the end of time t2 an event (204) may occur. Such an event may be locking out the server by controller 80 activating or locking out the dispense valve 38. Also the event 204 may include activation of indicator light indicating that the time t2 has expired. The times t1 and t2 are programmable in length as preferred by the user for the various recipes, beverages, beverage producing substances used. For example the time t1 may be 20 minutes as described above or any other period of time such as 30, 45, 1 hour, 1.25 hours, 1.5 hours. The time t2 can be programmed for such time periods as well. Additionally, the event 204 may be the activation of a new brew cycle such that the entire timing diagram of FIG. 10 is reset to point 200 shown thereon.

The total length of time t1 and t2, or dispense time "td" can be determined by the user on each individual brew cycle or may be determined in a preprogrammed manner by saving it in the memory of controller 80 set a particular defined freshness period. As such, the "freshness period" generally corresponds to the dispense period of time, or the time period 200-204, "td" as shown in the figures. This is a period of time that can be defined as the period of time during which there is no appreciable or significant change in the characteristics of the beverage during the heating cycles over the period of time.

the heating cycles, periods or pulses collectively define a heating time. This is the total time during which heat is applied to the beverage during the dispense time "td". The heating time is the time which is determined to be suitable to maintain the beverage at a desired temperature or within a general temperature range without significant alteration of the characteristics of the beverage. In other words, any change in the flavor of the beverage, such as coffee, would be acceptable over a given period of time when an amount of heat energy, generally defined in terms of the "heating time" is applied to the beverage.

It should also be appreciated that the timing diagrams described herein can be used individually or may be combined in other patterns. As such these timing diagrams are not limited and do not limit the scope of the claims hereinafter.

Figure 11:
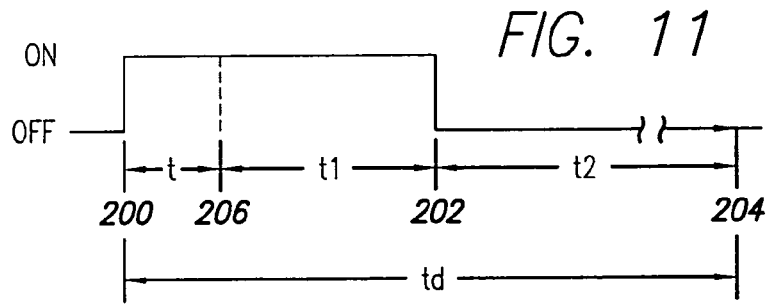

With regard to FIG. 11 a preheat period "C" is provided. "t" is a period of time that extends from the initiation of the brew cycle (200) to time period 206. The time "t" allows the system to preheat the server 20 prior to dispensing beverage into the server. Actual brewing or other beverage preparation occurs at the delayed point in time (206). The time period t is defined in terms of time or temperature. In this regard, the time period "t" from 200 to 206 would be preset or defined by the user as a predetermined period of time in minutes and seconds. Alternatively, the system can use the temperature sensor to detect when a sufficient temperature in the server has been achieved. The remaining heating and determination of heating as shown in FIG. 11 is similar to or identical to that as described herein above with regard to FIG. 10.

Figure 12:
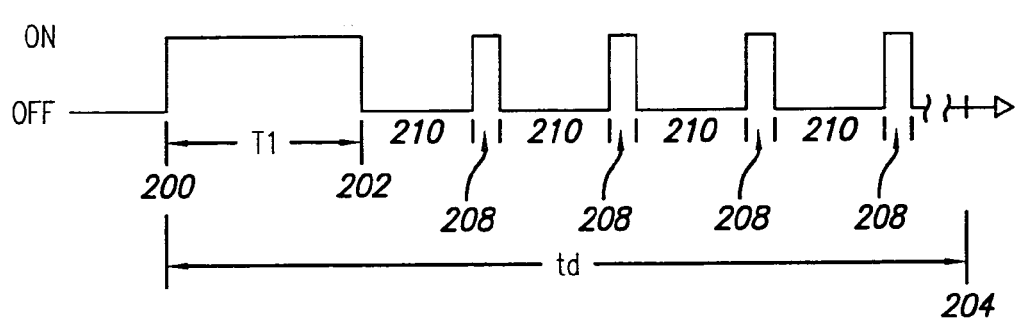

With regard to FIG. 12, an embodiment of the heating methods is shown in which the application of heat "on" is started in a similar manner to that as described in FIG. 10. In this regard, heat is initially applied for period 200-202, t1. At a predetermined time 202 heat is turned off. After initial heating, pulsing of heat "on" (208) can be provided at periodic intervals spaced by periods of no heat "off" (210). Pulsing can be initiated at the outset of the brew cycle 200 or may be continued for a period of time after initial heating. The pulsing 208 can provide incremental additional heat to the beverage to help maintain the temperature level of the beverage in the server. While the pulsing may be used to add the incremental heat without the potentially detrimental effects of continuous heating or "cooking" the beverage. While the temperature of the beverage may drop slightly during the "off" periods 210, the on pulses 208 may be used to boost the level to help maintain the temperature. It may be found that the temperature may decline slightly throughout the pulses. In this regard, the pulses can be tailored through testing or other means to provide suitable pulse "on" (208) periods.

The pulses as shown in FIG. 12 may be continued for an indefinite period of time until the server is drained, until the server is removed from its power source or until the initiation of a new brew cycle. The condition of draining the server may be detected by a level sensor in the server or removal of the server from the power source such that removal from the power source results in resetting the temperature control system.

Figure 13:
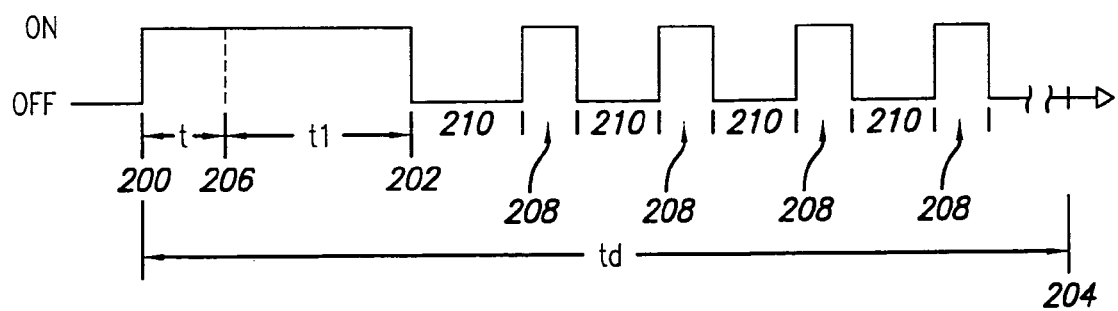

The timing diagram shown in FIG. 13 is essentially a combination of the methods and timing diagrams of FIG. 11 and FIG. 12. As such, the pulses 208 are provided in combination with a preheating time "t" to preheat the server. By comparison of FIGS. 12 and 13, it can be seen that the pulse "on" length may be varied depending on the results desired.

Figure 14:
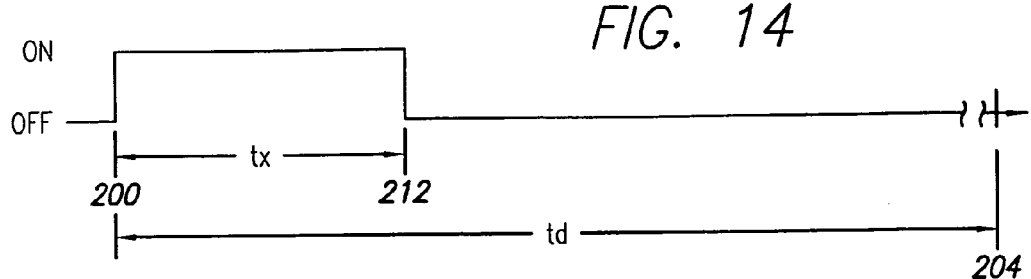
Figure 15:
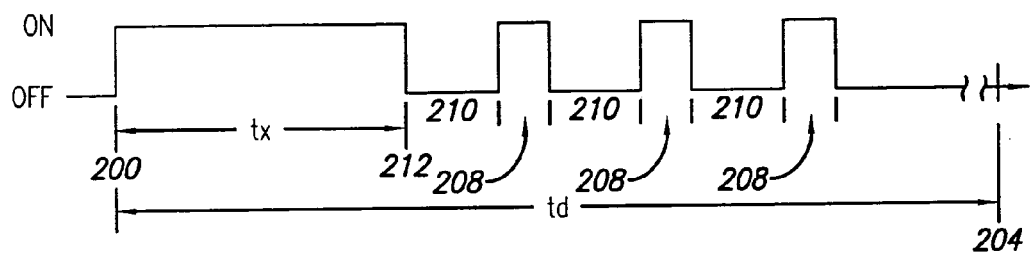
Figure 16:
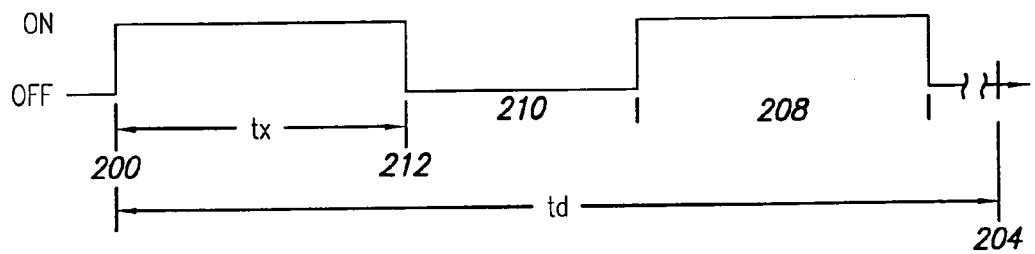

FIGS. 14, 15, and 16 show additional variations of the timing diagrams and heating methods as described herein above. In this regard, FIG. 14 shows a time period "tx" as defined as the period for a brew cycle. Brew cycle being defined from point 200 to point 212. Time can be predetermined as a specific time in terms of minutes and seconds and can be programmed as an indefinite period of time related to the activation and deactivation of a brewing component such as a brewing water dispensing valve 81. Brewing water dispensing valve 81 is illustratively provided in FIG. 20 but it should be understood that this type of control can be found in the aforementioned patents incorporated herein by reference as well as other brewing systems. By using the brewing component, the event can be programmed but the specific period of the event can be left to a particular recipe. A variety of other brewing system components or sensors may be used to indicate the end of the brew cycle. Regardless of the component or method of sensing the end of the brew cycle it is envisioned that this can be used to easily and efficiently program the method and system of the temperature control system.

With reference to FIG. 15, the method of setting the initial "on" heat period. "tx" for time period 200-212 is used in combination with heat pulsing similar to that as shown in FIGS. 12 and 13. This heat pulsing method may be used to achieve results similar to that as described with regard to FIGS. 12 and 13 herein above.

FIG. 16 provides yet a further variation on the timing diagram associated with the turning on and turning off of heat relative to the beverage. In this regard, heat is provided during the brew cycle time "tx" (200-212). It should also be appreciated that the method as shown in FIG. 16 can be used similar to the methods as shown in FIGS. 10-13. Instead of the multiple, relatively short pulses as depicted in previous figures, a relatively long "off" pulse 210 and a relatively long "on" pulse 208 is provided in FIG. 16. It may determine depending on the characteristics of the beverage to be heated that it is preferably to provide the initial "on" heating time and then provide a relatively long "off" heating time. At the conclusion of the initial "off" heating time (210) a relatively long "on" heating time (208) may be provided. In this regard, the second relatively long heating period 208 may provide sufficient heat energy to elevate the temperature of the beverage without cooking the beverage to further extend the temperature and flavor freshness life of the beverage.

Figure 17:
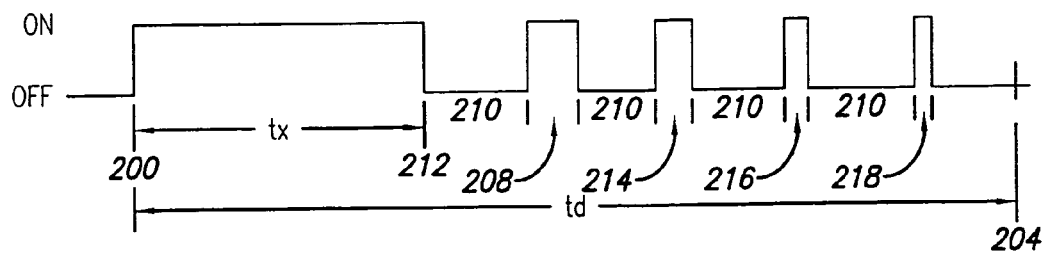

FIG. 17 shows yet a further variation in which the "on" pulses have variable length of time. In this regard, the initial on heating-time 200-212 may be keyed to any of the aforementioned initial heating times. After the initial heating time the "on" heating times may decrease in time such that the "on" pulse for period 208 is greater than the "on" pulse for period time 214. In this regard, time periods 216 and time period 218 may also decrease. It will be appreciated that the "off" time periods 210 may be uniform between the "on" time periods or may be varied in length. Through a series of tests or other calculations optimal time "on" pulsing and "off" pulsing may be determined. In this regard, the temperature control system as disclosed herein and claimed hereafter is envisioned to provide complete flexibility in controlling these time periods either by the user or by the system automatically setting these time periods. Time periods may be automatically set by the system if the system is programmed to recognize a particular beverage preparation recipe or a particular type of beverage to be produced. Time periods may also be keyed to the quantity of beverage to be initially produced such that a larger quantity of beverage will create a larger heat sinking mass which may require more temperature initially, as well as may provide a longer "coasting" time during which the heating element 41 is turned "off."

Still further variations on the control of the temperature are provided in FIGS. 18 and 19. As shown in FIGS. 18 and 19 a maximum "on" power is shown (220). The maximum on power is correlated or designed to accommodate the particular beverage being brewed, brewing system or other beverage preparation system constraints. Considering the foregoing disclosure information related to pulsing times "on" and pulsing times "off" an additional variable, the level of power applicable to the heating element 41 can be combined. In this regard, the initial "on" time t1 or tx may be used. Additionally a preheat time "f" may be used during this initial time period. Further, it should be appreciated that with any of the foregoing timing diagrams there is not a need for an initial lengthy time period, depending on the beverage being heated but rather timing may begin at the outset of the brew cycle or other time period.

With further reference to FIGS. 18 and 19, it is shown that the maximum power need not be applied throughout the entire heating cycle "td". Rather, as shown in FIG. 18, the power during the "on" pulses (208) may actually decrease with each subsequent pulse. While such pulses are shown in generally equal decreasing steps, it is envisioned that a variety of techniques may be used to increase or decrease the power associated with each "on" pulse. Similarly, as shown in FIG. 19 it may be desirable to wrap up to a particular maximum heat (220). Once again with reference to FIGS. 18 and 19, the pulse "on" duration and the pulse "off" duration may be equal, symmetrical or may be greater or smaller depending on the particular results to be achieved. As shown in FIG. 19, one variation on such combinations of heating and pulsing would be to start out at a lower temperature and apply pulses of increasing heat energy. Additionally, it may be desirable to decrease the length of time the increased heat energy is applied thereby quickly adding a considerable amount of energy over a short period of time potentially lessening any detrimental effects associated with heating.

Terms including brewed, brewing, brewing substance, brewing liquid, and brewed beverage as used herein are intended to be broadly defined as including but not limited to the brewing of coffee, tea and any other brewed beverage. This broad interpretation is also intended to include, but is not limited to any process of infusing, steeping, reconstituting, diluting, dissolving, saturating or passing a liquid through or otherwise mixing or combining a beverage substance with a liquid such as water without a limitation to the temperature of such liquid unless specified. This broad interpretation is also intended to include, but is not limited to beverage substances such as ground coffee, tea, liquid beverage concentrate, powdered beverage concentrate, freeze dried coffee or other beverage concentrates, to obtain a desired beverage or other food.

Applicant has provided descriptions and figures which are intended as an illustration of embodiments of the present disclosure. The disclosure of the figures and descriptions thereof are not intended to be construed as containing or implying limitation of the disclosure to those embodiments. Though it is appreciated that, although applicant has described various aspects of the disclosure with respect to specific embodiments, various alternatives, combinations or partial combinations and modifications will be apparent from the present disclosure which are within the scope and spirit of the present disclosure as set forth herein.

The invention claimed is:

1. A temperature control system in combination with a brewed beverage server, the temperature control system comprising: a brewed beverage server; a temperature sensor for sensing the temperature of a brewed beverage retained in the brewed beverage server; and a temperature control system operatively associated with at least the brewed beverage server, a heater of the temperature control system being controllably activated for a fixed period of time during which fixed period of time upon sensing a minimum temperature of the brewed beverage retained in the brewed beverage server and deactivated upon sensing a maximum temperature of the brewed beverage retained in the brewed beverage server to control the temperature of the brewed beverage retained in the brewed beverage server by providing controlled intermittent timed heating pulses corresponding to a predetermined heating profile upon heater activation and ceasing upon heater deactivation; further comprising a remote dispensing station, the remote dispensing station being separate from the brewed beverage maker and receiving the dispenser thereon, the remote dispensing station providing at least one of power and temperature control to the dispenser for controlling the temperature of the brewed beverage retained in the dispenser while positioned at the remote dispensing station.

2. The temperature control system as in claim 1 further comprising the heater being an active controllably energizable heating device.

3. The temperature control system as in claim 1 further comprising the brewed beverage server including a housing defining a chamber and an insulated reservoir defining a cavity, the reservoir being retained in the chamber of the brewed beverage server housing.

4. The temperature control system of claim 3 further comprising the heater being an active controllably energizable heating device at least partially extending into the chamber of the brewed beverage server.

5. The temperature control system as in claim 4 further comprising the heater being an active controllably energizable heating device at least partially extending into the chamber of the brewed beverage server and being positioned external to the reservoir.

6. The temperature control system as in claim 4 further comprising the heater being an active controllably energizable heating device at least partially extending into the chamber of the brewed beverage server housing and at least partially extending into the cavity of the reservoir.

7. The temperature control system as in claim 1 further comprising the heater being an active controllably energizable heating device positioned external to the brewed beverage server housing.

8. The temperature control system as in claim 1 further comprising programming temperature control information into the controller for defining at least one controllable predetermined heating profile.

9. The temperature control system as in claim 8 further comprising a memory device coupled with the controller for saving a plurality of temperature control information defining the at least one controllable predetermined heating profile.

10. The temperature control system as in claim 1 further comprising a brewed beverage maker, the temperature control system being carried on the brewed beverage maker for controlling temperature of liquid dispensed by the brewed beverage maker into the brewed beverage server.

11. The temperature control system as in claim 1 further comprising a remote dispensing station, the temperature control system being carried on the remote dispensing station for controlling the temperature of brewed beverages contained in the brewed beverage server when positioned at the remote dispensing station.

12. The temperature control system as in claim 1, the temperature control system being carried on the brewed beverage server for controlling temperature of brewed beverages retained in the brewed beverage server.

13. A method of controlling the temperature of a brewed beverage in a brewed beverage dispenser, the method comprising the steps of: providing a brewed beverage dispenser; providing a heater associated with the brewed beverage dispenser; dispensing brewed beverage into the brewed beverage dispenser; providing a temperature control system coupled to the heater associated with the brewed beverage dispenser for controllably providing heat to brewed beverage contained in the brewed beverage dispenser; operating the temperature control system to maintain the brewed beverage contained in the brewed beverage dispenser in a desired temperature range; activating heating when the brewed beverage is below a desired first temperature; and deactivating heating when the brewed beverage is at or above a desired second temperature, the activating heating providing intermittent timed pulses of heat of equal duration during heating of the brewed beverage from the desired first temperature to the desired second temperature for controllably providing heat to the brewed beverage retained in the brewed beverage dispenser between brew cycle activations.

14. The method of controlling the temperature of a brewed beverage in the brewed beverage dispenser as in claim 13 further comprising the step of:
   preheating the surface of the brewed beverage dispenser which contacts brewed beverage disposed in the beverage dispenser prior to dispensing brewed beverage into the brewed beverage dispenser.

15. The method of controlling the temperature of a brewed beverage in the brewed beverage dispenser as in claim 14 further comprising the step of:

continuing to preheat the surface of the brewed beverage dispenser until at least a predetermined temperature is achieved for dispensing brewed beverage into the brewed beverage dispenser.

16. The method of controlling the temperature of a brewed beverage in the brewed beverage dispenser as in claim 15 further comprising the step of:
maintaining the heating of the brewed beverage dispenser for at least a portion of the time during which brewed beverage is dispensed into the brewed beverage dispenser.

17. The method of controlling the temperature of a brewed beverage in the brewed beverage dispenser as in claim 15 further comprising the steps of:
continuing to heat the brewed beverage dispenser throughout a period of time during which brewed beverage is dispensed into the brewed beverage dispenser; and
deactivating heating of the brewed beverage dispenser after dispensing of brewed beverage into the dispenser had ceased.

18. The method of controlling the temperature of a brewed beverage in the brewed beverage dispenser as in claim 13 further comprising the step of:
defining a dispense period during which a brewed beverage in the dispenser can be dispensed from the dispenser;
calculating a heating time during which heat can be applied to the brewed beverage without significant alteration of the characteristics of the brewed beverage; and
heating the brewed beverage until expiration of the heating time, terminating heating of the brewed beverage after the expiration of the heating time and before the end of the dispense time.

19. The method of controlling the temperature of a brewed beverage in the brewed beverage dispenser as in claim 13 further comprising the steps of:
calculating a heating time during which the brewed beverage in the dispenser is heated;
activating the heater to heat the brewed beverage for a period proximate to a start of the heating time;
deactivating the heating during the heating time; and
activating the heater for at least one more time period before expiration of the heating time.

20. The method of controlling the temperature of a brewed beverage in the brewed beverage dispenser as in claim 19 further comprising the step of activating the heater for an initial heating period before initiation of each subsequent heating periods, the initial heating period generally being of a duration which is greater than each duration of the subsequent heating period, deactivating the heater after the initial heating period and prior to activation of the heater in subsequent heating periods.

21. A beverage system for making, retaining, dispensing and controllably heating a brewed beverage produced by and retained in the system, the beverage system comprising: a brewed beverage maker; a brewed beverage dispenser operatively associated with the brewed beverage maker for receiving brewed beverage produced by the maker; the brewed beverage dispenser including a reservoir defining a cavity for receiving brewed beverage from the maker and retaining the brewed beverage therein and a faucet for dispensing brewed beverage from the reservoir; and a temperature control system operatively associated with at least the brewed beverage dispenser, a heater of the temperature control system being controllably activated to control the temperature of the brewed beverage retained in the dispenser by providing controlled intermittent timed heating pulses upon heater activation and ceasing upon heater deactivation to maintain or permit a decline of the temperature of the brewed beverage throughout the collective period of pulses; further comprising a remote dispensing station, the remote dispensing station being separate from the brewed beverage maker and receiving the dispenser thereon, the remote dispensing station providing at least one of power and temperature control to the dispenser for controlling the temperature of the brewed beverage retained in the dispenser while positioned at the remote dispensing station.

22. The beverage system of claim 21 further comprising the temperature control system including memory for at least one set of information relating to heater activation and deactivation periods.

23. The beverage system of claim 21 further comprising the dispenser being a thermally insulated brewed beverage server.

24. The beverage system of claim 23 further comprising the heater being carried on the dispenser.

25. The beverage system of claim 24 further comprising the temperature control system being carried on the dispenser.

26. The beverage system of claim 21 further comprising the brewed beverage dispenser being a non-insulated server.

27. The beverage system of claim 26 further comprising the heater being positioned on the brewed beverage maker for providing controllable heating of the server.

28. The beverage system of claim 26 further comprising a dispensing station, the heater being positioned at the remote dispensing station for heating the server, the temperature control system being carried on the remote dispenser station for controllably activating and deactivating the heater.

29. The beverage system of claim 21 further comprising the brewed beverage maker including a water delivery system, an ingredient holder selectively couplable to the brewed beverage maker for retaining a quantity of brewed beverage preparation substance therein, water from the water delivery system being dispensed into the ingredient holder for combining water with the brewed beverage making substance to produce a brewed beverage for dispensing into the brewed beverage dispenser.

30. The beverage system as in claim 21 further comprising an indicator carried on the brewed beverage maker and coupled to the temperature control system, the indicator being activated upon deactivation of the heater.

31. The beverage system as in claim 21 further comprising an indicator carried on a server and coupled to the temperature control system, the indicator being activated upon the deactivation of the heater.

32. The beverage system of claim 22 further comprising a plurality of information relating to heater activation and deactivation at least one set of information relating to different temperature levels as well as activation and deactivation periods.

33. The temperature control system of claim 1 wherein the first preprogrammed value is about 165° F. and the second preprogrammed value is about 190° F.

34. The method of claim 13 further comprising operating the temperature control system to prevent brewed beverage from being provided to the brewed beverage dispenser until a heating level is attained.

35. The method of claim 13 further comprising the step of operating the temperature control system to add heat in response to a detected increase in the dispense rate of the brewed beverage from the brewed beverage dispenser.

36. The method of claim 13 further comprising the step of operating the temperature control system to select a customized preprogrammed temperature for the brewed beverage depending on the type of brewed beverage.

37. The beverage system of claim 21 wherein the temperature control system to activate and deactivate the heater provides heat to the brewed beverage retained in the brewed beverage dispenser to achieve a brewed beverage temperature between 165° F. and 190° F. by providing controlled intermittent timed pulses of heat between brew cycle activations.

38. The system of claim 1 further comprising a timer for providing intermittent pulses of heating to heat the brewed beverage.

* * * * *